(12) United States Patent
Fumoto et al.

(10) Patent No.: US 11,719,489 B2
(45) Date of Patent: Aug. 8, 2023

(54) HEAT EXCHANGER

(71) Applicant: NGK INSULATORS, LTD., Nagoya (JP)

(72) Inventors: Yutaro Fumoto, Nagoya (JP); Tatsuo Kawaguchi, Nagoya (JP); Daisuke Kimura, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 79 days.

(21) Appl. No.: 16/782,438

(22) Filed: Feb. 5, 2020

(65) Prior Publication Data
US 2020/0309464 A1 Oct. 1, 2020

(30) Foreign Application Priority Data

Mar. 27, 2019 (JP) .................. 2019-061721

(51) Int. Cl.
*F28D 7/10* (2006.01)
*F28D 1/04* (2006.01)
*F28F 9/02* (2006.01)

(52) U.S. Cl.
CPC ............. *F28D 7/10* (2013.01); *F28D 1/0408* (2013.01); *F28F 2009/029* (2013.01)

(58) Field of Classification Search
CPC . F28D 7/10; F28D 7/103; F28D 7/106; F28D 2021/008; F28D 21/0003; F28F 2265/26; F28F 21/04; F28F 2240/00; F01N 2240/02; F01N 13/1816; F01N 2470/12; F01N 3/0205; F01N 5/02; F01N 3/02; F01N 3/0234; F01N 3/2889
See application file for complete search history.

(56) References Cited

U.S. PATENT DOCUMENTS

| | | | | |
|---|---|---|---|---|
| 1,775,939 A * | 9/1930 | Matthaei | ............ | F01N 5/02 165/155 |
| 2,204,294 A * | 6/1940 | Blanchard | ............ | F01N 13/08 261/159 |
| 3,001,767 A * | 9/1961 | Straubing | ............ | F28F 9/24 165/154 |

(Continued)

FOREIGN PATENT DOCUMENTS

| CN | 1672008 A | 9/2005 |
|---|---|---|
| CN | 2903882 Y | 5/2007 |

(Continued)

OTHER PUBLICATIONS

Chinese Office Action (Application No. 202010189653.4) dated May 6, 2021 (with English translation).

(Continued)

*Primary Examiner* — Travis Ruby
*Assistant Examiner* — Christopher C Pillow
(74) *Attorney, Agent, or Firm* — Burr Patent Law, PLLC

(57) ABSTRACT

A heat exchanger 100, including: an inner cylinder 10 through which a first fluid can flow, the inner cylinder 10 being configured to house a heat recovery member 30; and an outer cylinder 20 disposed so as to be spaced on a radially outer side of the inner cylinder 10 such that a second fluid can flow between the outer cylinder 20 and the inner cylinder 10. In the heat exchanger 100, at least a part of the outer cylinder 20 and/or the inner cylinder 10 has at least one continuous irregular structure 40.

6 Claims, 8 Drawing Sheets

(56) References Cited

U.S. PATENT DOCUMENTS

| | | | | |
|---|---|---|---|---|
| 3,339,260 A | * | 9/1967 | Burne | F28D 7/106 29/890.036 |
| 3,409,075 A | * | 11/1968 | Long | F28F 13/003 165/154 |
| 3,818,975 A | * | 6/1974 | Tokumitsu | F28F 9/0239 165/95 |
| 4,326,503 A | * | 4/1982 | Geier | F24S 40/80 126/646 |
| 4,667,876 A | * | 5/1987 | Negishi | B60H 1/20 237/12.3 A |
| 4,729,428 A | * | 3/1988 | Yasutake | F28D 9/0062 165/153 |
| 4,747,448 A | * | 5/1988 | Beduz | F28F 13/187 165/133 |
| 4,852,642 A | * | 8/1989 | Lee | F28F 13/125 165/109.1 |
| 4,964,459 A | * | 10/1990 | Stenlund | F28D 7/106 123/41.33 |
| 5,145,215 A | * | 9/1992 | Udell | F16L 27/12 285/49 |
| 5,732,769 A | * | 3/1998 | Staffa | F28D 7/106 165/154 |
| 5,967,193 A | * | 10/1999 | Nagai | F01N 1/02 138/110 |
| 6,156,278 A | * | 12/2000 | Kruse | F01N 3/2889 422/180 |
| 7,255,096 B2 | * | 8/2007 | Craig | F28D 7/103 123/568.12 |
| 8,904,772 B2 | * | 12/2014 | Azuma | F01N 3/2889 60/320 |
| 9,459,052 B2 | * | 10/2016 | Kinder | F28F 13/12 |
| 10,619,947 B2 | | 4/2020 | Kawaguchi et al. | |
| 2005/0079110 A1 | * | 4/2005 | Jobson | F01N 3/2889 422/173 |
| 2005/0109493 A1 | * | 5/2005 | Wu | F28D 7/103 165/157 |
| 2006/0054381 A1 | * | 3/2006 | Takemoto | F28D 7/103 181/237 |
| 2006/0102321 A1 | | 5/2006 | Shincho et al. | |
| 2006/0201661 A1 | * | 9/2006 | Sugihara | F02M 26/32 165/158 |
| 2008/0029655 A1 | * | 2/2008 | Mabuchi | F01N 5/02 248/58 |
| 2009/0196799 A1 | * | 8/2009 | Evans | F28D 7/106 422/111 |
| 2011/0056653 A1 | * | 3/2011 | Zacharias | F28F 1/08 165/83 |
| 2011/0168369 A1 | * | 7/2011 | Kim | F28D 7/106 165/154 |
| 2011/0302910 A1 | * | 12/2011 | Burgers | F28D 7/103 60/299 |
| 2012/0222849 A1 | * | 9/2012 | Liu | F28F 13/12 165/181 |
| 2012/0247732 A1 | * | 10/2012 | Suzuki | F28F 21/04 165/104.14 |
| 2013/0133855 A1 | * | 5/2013 | Kim | F28F 1/424 165/41 |
| 2013/0213620 A1 | * | 8/2013 | Miyazaki | F28F 21/04 165/154 |
| 2013/0248159 A1 | * | 9/2013 | Yoshida | C04B 35/565 165/154 |
| 2014/0020877 A1 | * | 1/2014 | Suzuki | F01N 3/2889 165/181 |
| 2014/0090821 A1 | * | 4/2014 | Suzuki | F28F 7/02 165/168 |
| 2014/0110095 A1 | * | 4/2014 | Chang | F28F 1/40 165/181 |
| 2015/0114611 A1 | * | 4/2015 | Morris | B23P 15/26 165/166 |
| 2015/0241132 A1 | * | 8/2015 | Yanachi | F25B 40/00 165/154 |
| 2016/0003550 A1 | * | 1/2016 | Tokuda | F28D 7/103 165/140 |
| 2016/0341489 A1 | * | 11/2016 | Ichiyanagi | F28D 7/005 |
| 2017/0030652 A1 | * | 2/2017 | Penny | F02M 26/32 |
| 2017/0122161 A1 | * | 5/2017 | Fukami | F01N 5/02 |
| 2017/0138670 A1 | * | 5/2017 | Penny | F28D 21/0003 |
| 2017/0191401 A1 | * | 7/2017 | Ichiyanagi | F28D 7/10 |
| 2018/0066560 A1 | | 3/2018 | Kawaguchi et al. | |
| 2018/0128415 A1 | * | 5/2018 | Wakatsuki | F16L 59/065 |
| 2018/0142967 A1 | | 5/2018 | Kawaguchi et al. | |
| 2019/0186835 A1 | * | 6/2019 | Trojosky | F27B 7/386 |

FOREIGN PATENT DOCUMENTS

| | | |
|---|---|---|
| CN | 108071545 A | 5/2018 |
| DE | 10 2017 220 297 A1 | 5/2018 |
| EP | 2 511 644 B1 | 4/2020 |
| JP | 56-032792 Y | 8/1981 |
| JP | 2002-130060 A | 5/2002 |
| JP | 2002-130060 A1 | 5/2002 |
| JP | 2012-037165 A1 | 2/2012 |
| JP | 2014-066140 A | 4/2014 |
| JP | 2018-080900 A | 5/2018 |
| WO | 2016/185963 A1 | 11/2016 |
| WO | WO-2017215784 A1 * | 12/2017 ............... C04B 7/47 |

OTHER PUBLICATIONS

Chinese Office Action (Application No. 202010189653.4) dated Sep. 15, 2021 (with English translation).

Xiaofang Hu, *Engineering Thermodynamics*, "Chapter 2 The First Law of Thermodynamics," South China University of Technology Press, May 31, 2008, 1st Edition, pp. 43.

Japanese Office Action (with English translation), Japanese Application No. 2019-061721, dated Jan. 4, 2022 (10 pages).

German Office Action (with English translation), Gennan Application No. 10 2020 201 715.8, dated Jan. 10, 2022 (12 pages).

Japanese Office Action (with English translation), Japanese Application No. 2019-061721, dated Jun. 14, 2022 (8 pages).

* cited by examiner

HEAT EXCHANGER

FIELD OF THE INVENTION

The present invention relates to a heat exchanger.

BACKGROUND OF THE INVENTION

Recently, there is a need for improvement of fuel economy of motor vehicles. In particular, a system is expected that worms up a coolant, engine oil and an automatic transmission fluid (ATF: Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

A such systems, for example, there is a heat exchanger. The heat exchanger is a device that exchanges heat between a first fluid and a second fluid by allowing the first fluid to flow inside and the second fluid to flow outside. In such a heat exchanger, for example, the heat can be effectively utilized by exchanging the heat from the first fluid having a higher temperature (for example, an exhaust gas) to the second fluid having a lower temperature (for example, cooling water).

Patent Document 1 proposes a heat exchanger including: a heat collecting portion formed as a honeycomb structure having a plurality of cells through which a first fluid (for example, an exhaust gas) can flow; and a casing arranged to cover an outer peripheral surface of the heat collecting portion, through which a second fluid (for example, cooling water) can flow between the heat collecting portion and the casing.

However, the heat exchanger of Patent Document 1 has a structure in which waste heat from the first fluid to the second fluid is constantly collected. Therefore, even if there is no need to collect the waste heat, the waste heat might be collected. Therefore, the heat exchanger has been required to increase a capacity of a radiator for discharging the collected waste heat even if there has been no need to collect the waste heat.

Therefore, Patent Document 2 proposes a heat exchanger including: an inner cylinder disposed such that a casing arranged so as to cover an outer peripheral surface of a honeycomb structure is fitted to an outer peripheral surface of the honeycomb structure; an intermediate cylinder disposes so as to cover the inner cylinder; an outer cylinder arranged so as to cover the intermediate cylinder, wherein an inner-side outer peripheral flow path is formed between the inner cylinder and the intermediate cylinder, and an outer-side outer peripheral flow path is formed between the intermediate cylinder and the outer cylinder. According to the heat exchanger, when a temperature of the inner cylinder is lower than a boiling point of a refrigerant (a second fluid) (when it is necessary to recover waste heat), the inner-side outer peripheral flow path and the outer-side outer peripheral flow path are filled with the refrigerant in the form of liquid, so that heat exchange can be promoted. Further, when a temperature of the inner cylinder is equal to or higher than the boiling point of the refrigerant (when it is not necessary to recover the waste heat), the gaseous refrigerant generated by boiling and vaporizing is present in the inner-side outer peripheral flow path, so that heat exchange can be suppressed. Therefore, the heat exchanger can perform switching between promotion and suppression of the heat exchanger between the two types of fluids.

CITATION LIST

Patent Literatures

Patent Document 1: Japanese Patent Application Publication No. 2012-037165 A
Patent Document 2: WO 2016/185963 A1

SUMMARY OF THE INVENTION

The present invention relates to a heat exchanger, comprising:
an inner cylinder through which a first fluid can flow, the inner cylinder being configured to house a heat recovery member; and
an outer cylinder disposed so as to be spaced on a radially outer side of the inner cylinder such that a second fluid can flow between the outer cylinder and the inner cylinder;
wherein at least a part of the outer cylinder and/or the inner cylinder has at least one continuous irregular structure.

The present invention also relates to a heat exchanger, comprising:
an inner cylinder through which a first fluid can flow, the inner cylinder being configured to house a heat recovery member; and
an outer cylinder disposed so as to be spaced on a radially outer side of the inner cylinder such that a second fluid can flow between the outer cylinder and the inner cylinder;
wherein the heat exchanger comprises at least one buffer member having at least one continuous irregular structure, formed on at least one portion selected from portions between two or more divided parts of the outer cylinder, portions between two or more divided parts of the inner cylinder, and portions between the outer cylinder and the inner cylinder.

According to the present invention, it is possible to provide a heat exchanger that can suppress plastic deformation of members due to a temperature difference during heat exchange between a first fluid and a second fluid.

DETAILED DESCRIPTION OF THE INVENTION

The present inventors have studied the heat exchanger as described in Patent Document 2, and found that when performing heat exchange between the first fluid and the second fluid, a difference of temperatures between a portion in contact with the first fluid and a portion in contact with the second fluid is increased, and members may be plastically deformed due to thermal stress. Such deformation of the members will cause degraded performance of waste heat recovery.

The present invention has been made to solve the above problems. An object of the present invention is to provide a heat exchanger which can suppress plastic deformation of members due to the temperature difference during heat exchange between the first fluid and the second fluid.

As results of intensive studies to solve the above problems, the present inventors have found that by forming a continuous irregular structure on a specific member, or by providing a member having a continuous irregular structure on a specific portion, the plastic deformation of the members due to the temperature difference can be suppressed, and have completed the present invention.

Hereinafter, embodiments of the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

Embodiment 1

Figure 1:
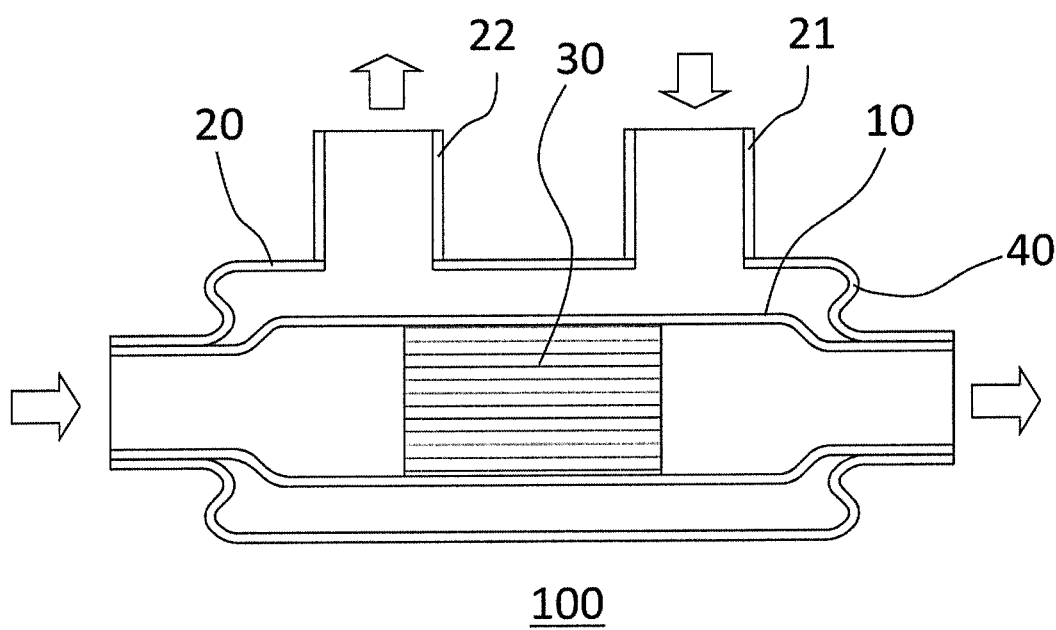
FIG. 1 is a cross-sectional view of a heat exchanger according to Embodiment 1 of the present invention.
Figure 2:
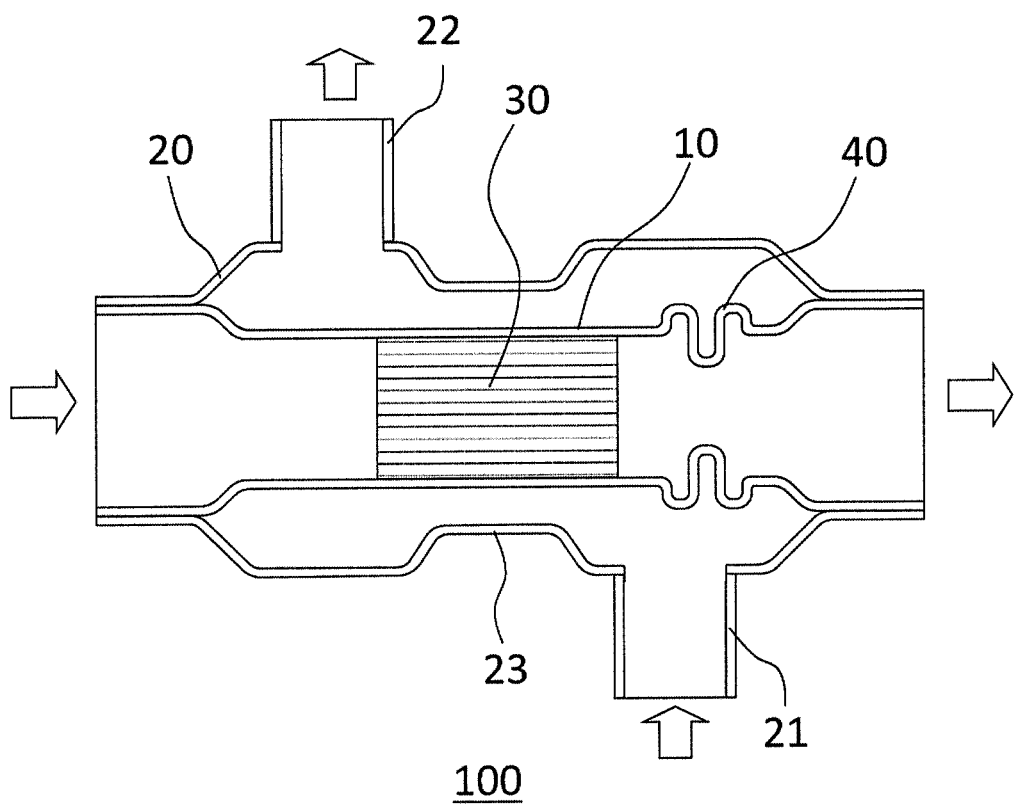
FIG. 2 is a cross-sectional view of other heat exchanger according to Embodiment 1 of the present invention.

FIGS. 1 and 2 are cross-sectional views (cross-sectional views parallel to a flow direction of a first fluid) of a heat exchanger according to Embodiment 1 of the present invention.

As shown in FIGS. 1 and 2, a heat exchanger 100 according to Embodiment 1 of the present invention includes: an inner cylinder 10; and an outer cylinder 20 disposed to be spaced on a radially outer side of the inner cylinder 10. Inner peripheral surfaces of both ends in an axial direction of the outer cylinder 20 are fixed to an outer peripheral surface of the inner cylinder 10 by welding or the like. Therefore, a first fluid can flow through the inner cylinder 10, and a second fluid can flow between the inner cylinder 10 and the outer cylinder 20.

The heat exchanger 100 may further include a heat recovery member 30 housed in the inner cylinder 10.

As the first fluid and the second fluid, various liquids and gases can be used. For example, when the heat exchanger 100 is mounted on a motor vehicle, an exhaust gas can be used as the first fluid, and water or antifreeze (LLC defined by JIS K2234: 2006) can be used as the second fluid. Further, the first fluid can be a fluid having a temperature higher than that of the second fluid.

When performing heat exchange between the first fluid and the second fluid, the first fluid having a higher temperature flows inside the inner cylinder 10, while the second fluid having a lower temperature flows outside the inner cylinder 10, thereby generating a temperature difference in the cylinder 10, resulting in a difference in a thermal expansion behavior. That is, in the inner cylinder 10, a portion in contact with the first fluid having the higher temperature tends to expand, whereas a portion in contact with the second fluid having the lower temperature tends to contract. Due to such a difference in the thermal expansion behavior, a larger thermal stress is generated in the inner cylinder 10. When the inner cylinder 10 cannot withstand the thermal stress, it is plastically deformed, and a gap is generated between the inner cylinder 10 and the heat recovery member 30. When such a gap is generated, the heat recovered by the heat recovery member 30 cannot be efficiently transmitted to the second fluid via the inner cylinder 10, resulting in reduced waste heat recovery performance.

Therefore, in the heat exchanger 100 according to Embodiment 1 of the present invention, at least one continuous irregular structure 40 is formed on at least a part of the outer cylinder 20 and/or the inner cylinder 10.

FIG. 1 shows the heat exchanger 100 having the continuous irregular structures 40 formed in a part of the outer cylinder 20. FIG. 2 shows the heat exchanger 100 having the continuous irregular structure 40 formed in a part of the inner cylinder 10.

In the heat exchanger 100 as shown in FIG. 1, the continuous irregular structures 40 formed on the outer cylinder 20 have a function of elastically deforming the outer cylinder 20 in various directions. Therefore, the continuous irregular structures 40 are elastically deformed so that the outer cylinder 20 expands and contracts in accordance with the thermal stress of the inner cylinder 10. Due to the elastic deformation of the continuous irregular structures 40 formed in the outer cylinder 20, the thermal stress of the inner cylinder 10 is alleviated, so that the plastic deformation of the inner cylinder 10 can be suppressed.

In the heat exchanger 100 as shown in FIG. 2, the continuous irregular structure 40 formed in the inner cylinder 10 has a function of elastically deforming the inner cylinder 10 in various directions. Therefore, the continuous irregular structure 40 is elastically deformed so that the inner cylinder 10 expands and contracts in accordance with the thermal stress of the inner cylinder 10. Due to the elastic deformation of the continuous irregular structure 40 formed in the inner cylinder 10, the thermal stress of the inner cylinder 10 is alleviated, so that the plastic deformation of the inner cylinder 10 can be suppressed.

A position of the continuous irregular structure 40 formed in the outer cylinder 20 or the inner cylinder 10 is not particularly limited. From the viewpoint of not inhibiting the heat exchange, the continuous irregular structures 40 are preferably formed at ends in the axial direction of the outer cylinder 20 or the inner cylinder 10.

The number of the continuous irregular structures 40 formed in the outer cylinder 20 or the inner cylinder 10 is not particularly limited, but it is preferably one, more preferably two.

Although not shown, the continuous irregular structures 40 may be formed in at least a part of both the outer cylinder 20 and the inner cylinder 10. Even with such a structure, the above effects can be obtained.

The continuous irregular structure 40 is not particularly limited as long as it is a structure in which the irregularities are continuous in various directions in the outer cylinder 20 or the inner cylinder 10, and various known structures can be used. Among others, the continuous irregular structure 40 is preferably a bellows structure.

As used herein, the "bellows structure" refers to a structure having one or more repeating structures of a mountain-folded portion and a valley-folded portion on the surface of a target structure (for example, the outer cylinder 20 and the inner cylinder 10).

The number of repeating structures of the bellows structure is preferably two or more, more preferably three or more, and still more preferably five or more. This is because the larger the number of repeating structures, the higher the expansion/contraction ability, thereby improving the ability to reduce thermal stress.

Hereinafter, each member forming the heat exchanger 100 will be further described in detail for each member.

<Regarding Inner Cylinder 10>

The inner cylinder 10 is a cylindrical member disposed on an outer peripheral surface of the heat recovery member 30 in the axial direction (the flow direction of the first fluid).

An inner peripheral surface of the inner cylinder 10 may be in direct or indirect contact with an axial outer peripheral surface of the heat recovery member 30. However, in terms of thermal conductivity, it is preferable that an axial direction of the heat recovery member 30 is in direct contact with the outer peripheral surface. In this case, a cross-sectional shape of the inner peripheral surface of the inner cylinder 10 matches a cross-sectional shape of the outer peripheral surface of the heat recovery member 30. Also, it is preferable that the axial direction of the first inner cylinder 10 coincides with that of the heat recovery member 30, and a central axis of the first inner cylinder 60 coincides with that of the heat recovery member 30.

It is preferable that an axial length of the inner cylinder 10 is longer than that of the heat recovery member 30. In the axial direction of the inner cylinder 10, a center position of the inner cylinder 10 preferably matches that of the heat recovery member 30.

Diameters (an outer diameter and an inner diameter) of the first inner cylinder 10 may be uniform in the axial direction, but the diameter of at least a part (for example, both ends in the axial direction or the like) of the inner cylinder may be reduced or expanded.

Since the heat of the first fluid passing through the heat recovery member 30 is transmitted to the inner cylinder 10 via the heat recovery member 30, the inner cylinder 10 is preferably formed of a material having good heat conductivity. Examples of a material used for the inner cylinder 10 include, metals, ceramics, and the like. Examples of the metals include stainless steel, titanium alloys, copper alloys, aluminum alloys, and brass. The material of the inner cylinder 10 is preferably stainless steel because of its higher durability and reliability.

<Regarding Outer Cylinder 20>

The outer cylinder 20 is a cylindrical member disposed so as to be spaced on a radially outer side of the inner cylinder 10.

It is preferable that an axial direction of the outer cylinder 20 coincides with that of each of the heat recovery member 30 and the inner cylinder 10, and a central axis of the outer cylinder 20 coincides with that of each of the heat recovery member 30 and the inner cylinder 10.

It is preferable that an axial length of the outer cylinder 20 is set to be longer than that of the heat recovery member 30. In the axial direction of the outer cylinder 20, a center position of the outer cylinder 20 preferably matches that of each of the heat recovery member 30 and the inner cylinder 10.

The outer cylinder 20 is connected to both a feed pipe 21 for feeding the second fluid to a region between the outer cylinder 20 and the inner cylinder 10, and a discharge pipe 22 for discharging the second fluid to a region between the outer cylinder 20 and the inner cylinder 10. The feed pipe 21 and the discharge pipe 22 are preferably provided at positions corresponding to both axial ends of the heat recovery member 30, respectively.

The feed pipe 21 and the discharge pipe 22 may extend in the same direction, or may extend in different directions as shown in FIG. 2.

Diameters (an outer diameter and an inner diameter) of the outer cylinder 20 may be uniform in the axial direction, but the diameter of at least a part (for example, a central portion in the axial direction, both ends in the axial direction, or the like) of the outer cylinder may be reduced or expanded. For example, by reducing the diameter of the central portion in the axial direction of the outer cylinder 20 to form a reduced portion 23 as shown in FIG. 2, the second fluid in the outer cylinder 20 on the feed pipe 21 and discharge pipe 22 sides can spread throughout the outer peripheral direction of the inner cylinder 10. Also, in the reduced portion 23 of the outer cylinder 20, a cross-sectional area of the flow path is reduced, so that a flow velocity of the second fluid is increased to promote heat transfer. Therefore, the heat exchange efficiency can be improved.

Figure 3A:
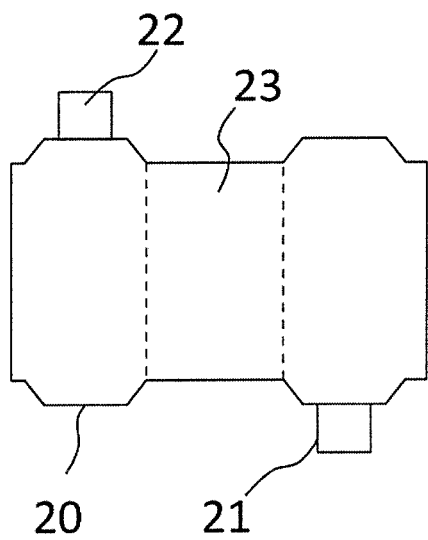
FIGS. 3(a) and 3(b) are side views of a heat exchanger according to Embodiment 1 of the present invention.
Figure 3B:
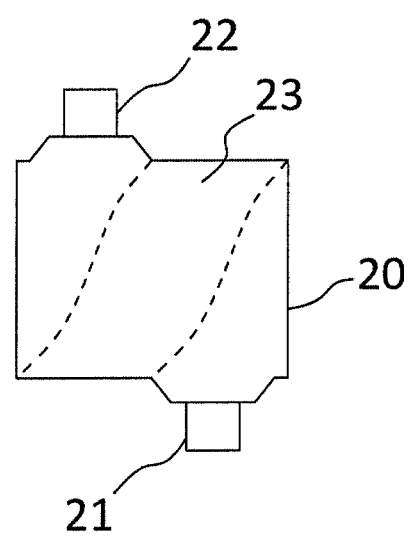

Further, the reduced portion 23 may be formed in a spiral shape along the axial direction of the outer cylinder 20. Here, a side view of the heat exchanger 100 is shown in FIG. 3. FIG. 3(a) is a side view of the heat exchanger 100 of FIG. 2, in which the reduced portion 23 is formed at a central portion in the axial direction of the outer cylinder 20. On the other hand, as shown in FIG. 3(b), the reduced portion 23 is formed in a spiral shape along the axial direction of the outer cylinder 20, so that in addition to the above effect of the reduced portion 23, the axial length can be reduced. Therefore, the size of the heat exchanger 100 can be reduced.

The outer cylinder 20 can preferably be made of a metal or ceramics. Examples of metal include stainless steel, titanium alloys, copper alloys, aluminum alloys, brass and the like. Among them, the material of the outer cylinder 20 is preferably the stainless steel because it has high durability and reliability.

<Regarding Heat Recovery Member 30>

The heat recovery member 30 is not particularly limited as long as it can recover heat. For example, a honeycomb structure can be used as the heat recovery member 30.

The honeycomb structure is generally a pillar shaped structure. A cross-sectional shape perpendicular to the axial direction of the honeycomb structure is not particularly limited, and it may be a circle, an ellipse, a quadrangle, or other polygons.

The honeycomb structure has a plurality of cells separated from each other by partition walls and an outer peripheral wall which are mainly based on ceramics. Each of the cells passes through the interior of the honeycomb structure from a first end face to a second end face of the honeycomb structure. The first end face and the second end face are both end faces of the honeycomb structure in the axial direction (a cell extending direction).

Each of the cells may have any cross-sectional shape (a shape of a cross section perpendicular to the cell extending direction), including, but not particularly limited to, circular, elliptical, triangular, quadrangular, hexagonal and other polygonal shapes.

Also, the cells may be radially formed in a cross section in a direction perpendicular to the cell extending direction. Such a structure can allow heat of the first fluid flowing through the cells to be efficiently transmitted to the outside of the honeycomb structure.

The outer peripheral wall preferably has a thickness larger than that of the partition wall. Such a structure can lead to increased strength of the outer peripheral wall which would otherwise tend to generate breakage (e.g., cracking, chinking, and the like) by thermal stress or the like due to a temperature difference between the first fluid and the second fluid.

A thickness of each partition wall is not particularly limited, and it may be adjusted as needed depending on applications. For example, the thickness of each partition wall may preferably be from 0.1 to 1 mm, and more preferably from 0.2 to 0.6 mm. The thickness of the partition wall of 0.1 mm or more can provide the honeycomb structure with a sufficient mechanical strength. Further, the thickness of the partition wall of 1 mm or less can prevent problems that the pressure loss is increased due to a decrease in an opening area and the heat recovery efficiency is decreased due to a decrease in a contact area with the first fluid.

A method for producing the heat exchanger 100 will be now described.

The heat exchanger 100 can be produced in accordance with a method known in the art. For example, when using the honeycomb structure as the heat recovery member 30, the heat exchanger 100 can be produced as described below.

First, a green body containing ceramic powder is extruded into a desired shape to prepare a honeycomb formed body. The material of the honeycomb formed body is not particularly limited, and a known material can be used. For example, when producing a honeycomb formed body containing a Si-impregnated SiC composite as a main component, a binder and water or an organic solvent are added to a predetermined amount of SiC powder, and the resulting mixture is kneaded to form a green body, which can be then formed into a honeycomb formed body having a desired shape. The resulting honeycomb formed body can be then dried, and the dried honeycomb formed body can be impregnated with metallic Si and fired in an inert gas under reduced pressure or vacuum to obtain a honeycomb structure having cells serving as flow paths for the first fluid, defined by partition walls.

The honeycomb structure is then inserted into the inner cylinder 10, and the inner cylinder 10 is arranged so as to be fitted to the honeycomb structure by shrink fitting. The honeycomb structure and the inner cylinder 10 may be fitted by press fitting, brazing, diffusion bonding, or the like, instead of the shrink fitting. When a diameter of a part of the inner cylinder 10 is reduced or enlarged, it may be performed after the inner cylinder 10 is arranged or before the inner cylinder 10 is arranged.

The structure produced above is disposed inside the outer cylinder 20 provided with the feed pipe 21 and the discharge pipe 22 for the second fluid, and fixed by welding or the like.

The method of forming the continuous irregular structure 40 in the inner cylinder 10 and/or the outer cylinder 20 is not particularly limited, and various processing methods such as mechanical means and hydraulic means can be used. Further, the continuous irregular structure 40 may be previously formed in the inner cylinder 10 and/or the outer pipe 20, or may be formed after being arranged at a predetermined position.

According to the heat exchanger 100 according to Embodiment 1 of the present invention, the continuous irregular structure 40 is formed in at least a part of the outer cylinder 20 and/or the inner cylinder 10. Therefore, the continuous irregular structure 40 can alleviate the thermal stress generated in the inner cylinder 10 by elastic deformation, so that plastic deformation of the inner cylinder 10 can be suppressed.

Embodiment 2

Figure 4:
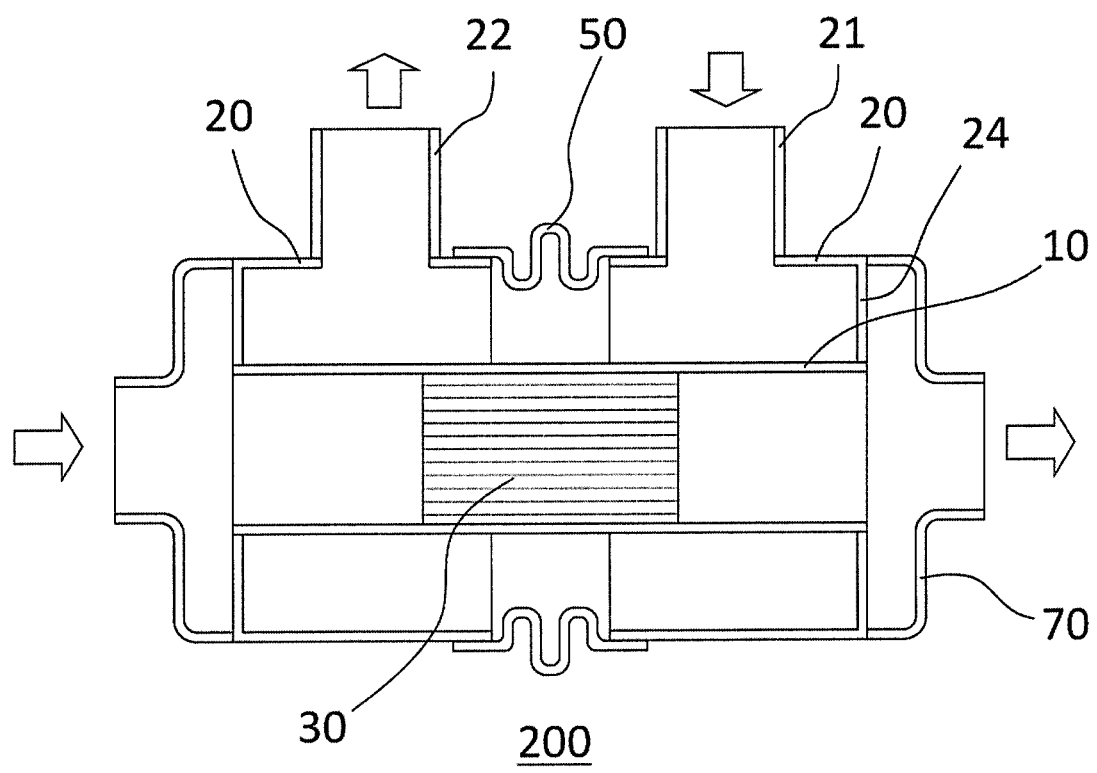
FIG. 4 is a cross-sectional view of a heat exchanger according to Embodiment 2 of the present invention.
Figure 5:
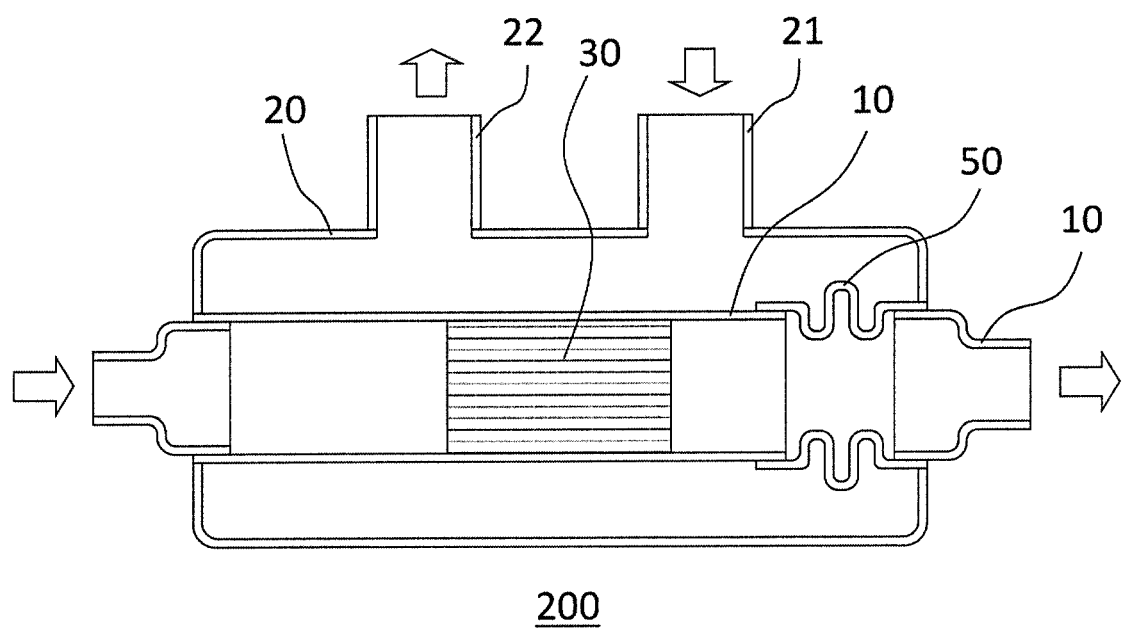
FIG. 5 is a cross-sectional view of other heat exchanger according to Embodiment 2 of the present invention.
Figure 6:
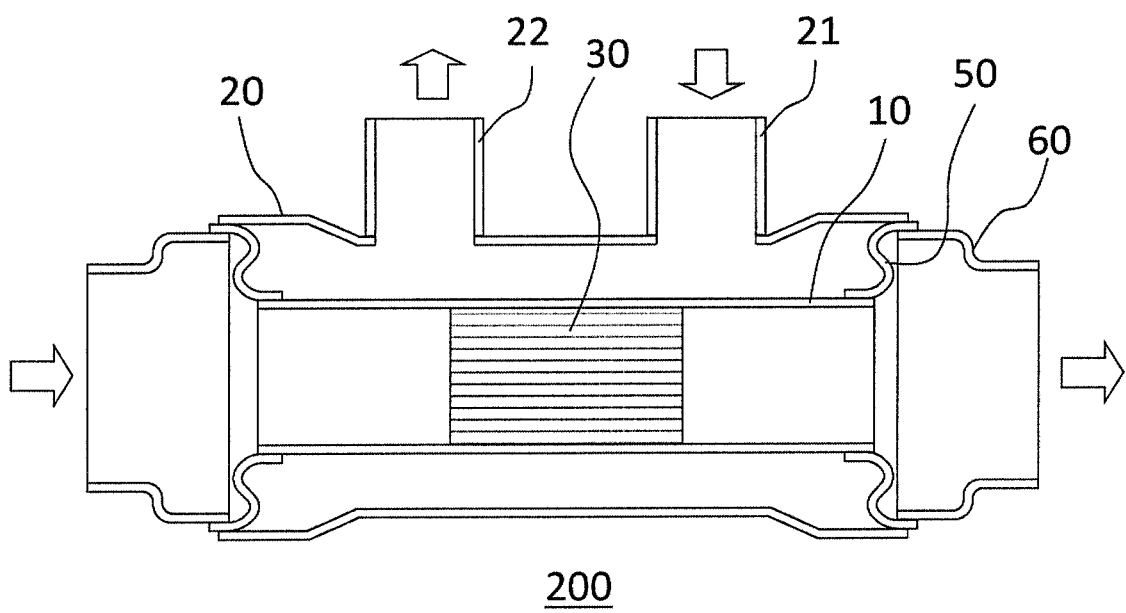
FIG. 6 is a cross-sectional view of other heat exchanger according to Embodiment 2 of the present invention.

FIGS. 4 to 6 are cross-sectional views (cross-sectional views parallel to the flow direction of the first fluid) of a heat exchanger according to Embodiment 2 of the present invention. The members having the same reference numerals as those appearing in the descriptions of the heat exchanger 100 according to Embodiment 1 of the present invention are the same as those of a heat exchanger 200 according to Embodiment 2 of the present invention. Therefore, the descriptions thereof are omitted.

In the heat exchanger 100 according to Embodiment of the present invention, the continuous irregular structure 40 is formed in at least a part of the outer cylinder 20 and/or the inner cylinder 10. However, the heat exchanger 200 according to Embodiment 2 of the present invention is different from the heat exchanger 100 according to Embodiment 1 in that the continuous irregular structure 40 is formed in a buffer member 50 provided separately from the outer cylinder 20 and the inner cylinder 10.

FIG. 4 shows the heat exchanger 200 in which a buffer member 50 having a continuous irregular structure 40 is arranged between two or more divided outer cylinders 20. As with the heat exchanger 100 according to Embodiment 1 of the present invention, the heat exchanger 200 can suppress the elastic deformation of the inner cylinder 10 because the continuous irregular structure 40 of the buffer member 50 disposed between the two or more divided outer cylinders 20 is elastically deformed, thereby alleviate the thermal stress generated in the inner cylinder 10. It should be noted that the two or more divided outer cylinders 20 means that the outer cylinder is divided into two or more parts in the longitudinal direction of the outer cylinder 20.

In the heat exchanger 200 as shown in FIG. 4, the outer cylinder 20 has walls 24 each extending in the radial direction, and each wall 24 of the outer cylinder 20 is connected to the inner cylinder 10. The heat exchanger 200 further includes cones 70 each fixed to one end of the outer cylinder 20 having the wall 24 by welding or the like.

The heat exchanger 200 having such a structure can further suppress the deformation of the inner cylinder 10 because when the inner cylinder 10 expands, the wall 24 of the outer cylinder 20 is elastically deformed.

Each cone 70 is a cylindrical member. Preferably, an axial direction of the cone 70 coincides with that of the outer cylinder 20 and the like, and a central axis of the cone 70 coincides with that of the outer cylinder 20. Also, a diameter of one end of the cone 70 fixed to the outer cylinder 20 is preferably the same as that of the outer cylinder 20.

As a material used for the cone 70, for example, a metal, a ceramic, or the like can be used. Examples of the metal include stainless steel, titanium alloys, copper alloys, aluminum alloys, and brass. The material of the cone 70 is preferably stainless steel because of its higher durability and reliability.

FIG. 5 shows the heat exchanger 200 in which the buffer member 50 having the continuous irregular structure 40 is disposed between two or more divided inner cylinders 10. As with the heat exchanger 100 according to Embodiment 1 of the present invention, the heat exchanger 200 can suppress the elastic deformation of the inner cylinder 10 because the continuous irregular structure 40 of the buffer member 50 disposed between the two or more divided inner cylinders 10 is elastically deformed to alleviate the thermal stress generated in the inner cylinder 10. It should be noted that the two or more divided inner cylinders 10 means that the inner cylinder 10 is divided into two or more parts in the longitudinal direction of the inner cylinder 10.

FIG. 6 shows the heat exchanger 200 in which the buffer members 50 each having the continuous irregular structure 40 are each disposed between the outer cylinder 20 and the inner cylinder 10. As with the heat exchanger 100 according to Embodiment of the present invention, the heat exchanger 200 can suppress the elastic deformation of the inner cylinder 10 because the continuous irregular structure 40 of each buffer member 50 disposed between the outer cylinder 20 and the inner cylinder 10 is elastically deformed to alleviate the thermal stress generated in the inner cylinder 10.

It should be noted that FIGS. 4 to 6 show examples where the buffer member(s) 50 is/are provided between the two or more divided outer cylinders 20, between the two or more divided inner cylinders 10, or between the outer cylinder 20 and the inner cylinder 10. However, the buffer members 50 may be arranged at these two or more positions.

Each of the buffer members 50 is a cylindrical member, and the continuous irregular structures 40 are formed in a part of the buffer members 50.

When the buffer member 50 is disposed between the two or more divided outer cylinders 20 or the two or more divided inner cylinders 10, as shown in FIGS. 4 and 3, both ends of the buffer member 50 in the axial direction are fixed to the outer cylinder 20 or the inner cylinder 10 by welding or the like. Further, the buffer member 50 and the outer cylinder 20 or the inner cylinder 10 may be directly fixed, or may be indirectly fixed via other member.

When the buffer members 50 are each arranged between the outer cylinder 20 and the inner cylinder 10, as shown in FIG. 6, one end of each buffer member 50 in the axial direction is fixed to the outer cylinder 20 by welding or the like, and the other end in the axial direction is fixed to the inner cylinder 10 by welding or the like. Each buffer member 50 and the outer cylinder 20 or the inner cylinder 10 may be directly fixed, or may be indirectly fixed via other member.

As a material used for the buffer member 50, for example, a metal, ceramics, or the like can be used. Examples of the metal include stainless steel, titanium alloys, copper alloys, aluminum alloys, and brass. The material of the buffer member 50 is preferably stainless steel because of its higher durability and reliability.

The heat exchanger 200 having the above structure can be produced according to a method known in the art, as with the heat exchanger 100. Further, the buffer member 50 may be arranged on each member at an appropriate stage according to positions to be disposed. The method of forming the buffer member 50 having the continuous irregular structure 40 is not particularly limited, and various processing methods such as mechanical means and hydraulic means can be used.

As with the heat exchanger 100 according to Embodiment 1 of the present invention, the heat exchanger 200 according to Embodiment 2 of the present invention having the buffer member(s) 50 at the predetermined position(s) can suppress the plastic deformation of the inner cylinder 10 because the continuous irregular structure 40 of the buffer member 50 is elastically deformed to alleviate the thermal stress generated in the inner cylinder 10.

Embodiment 3

Figure 7:
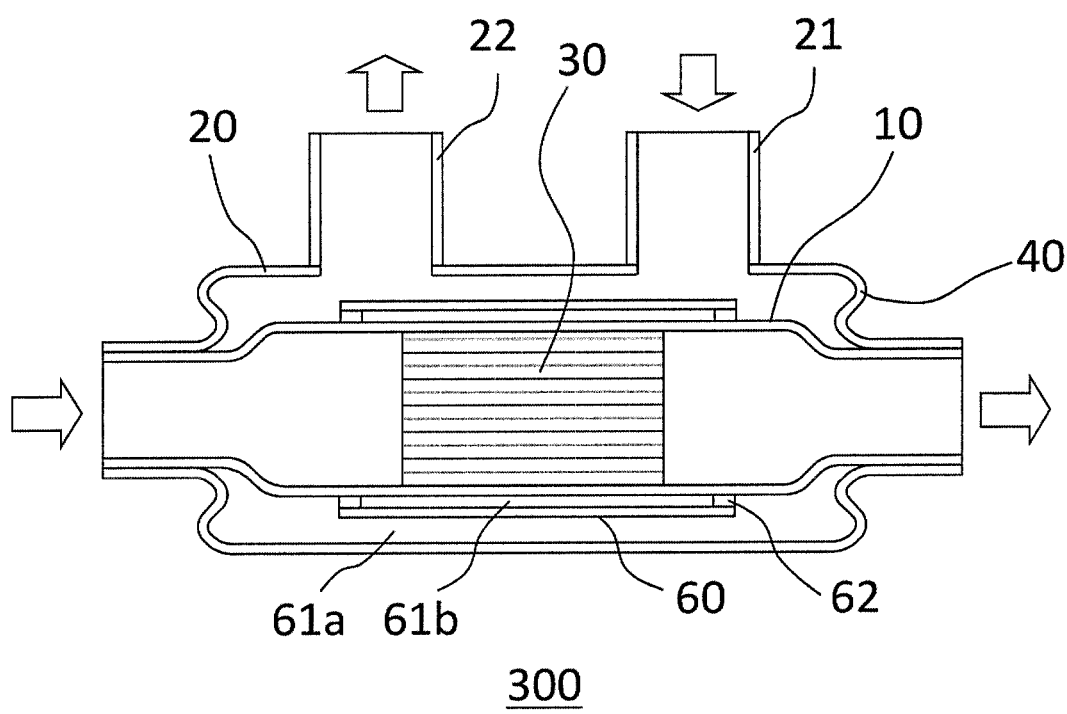
FIG. 7 is a cross-sectional view of a heat exchanger according to Embodiment 3 of the present invention.
Figure 8:
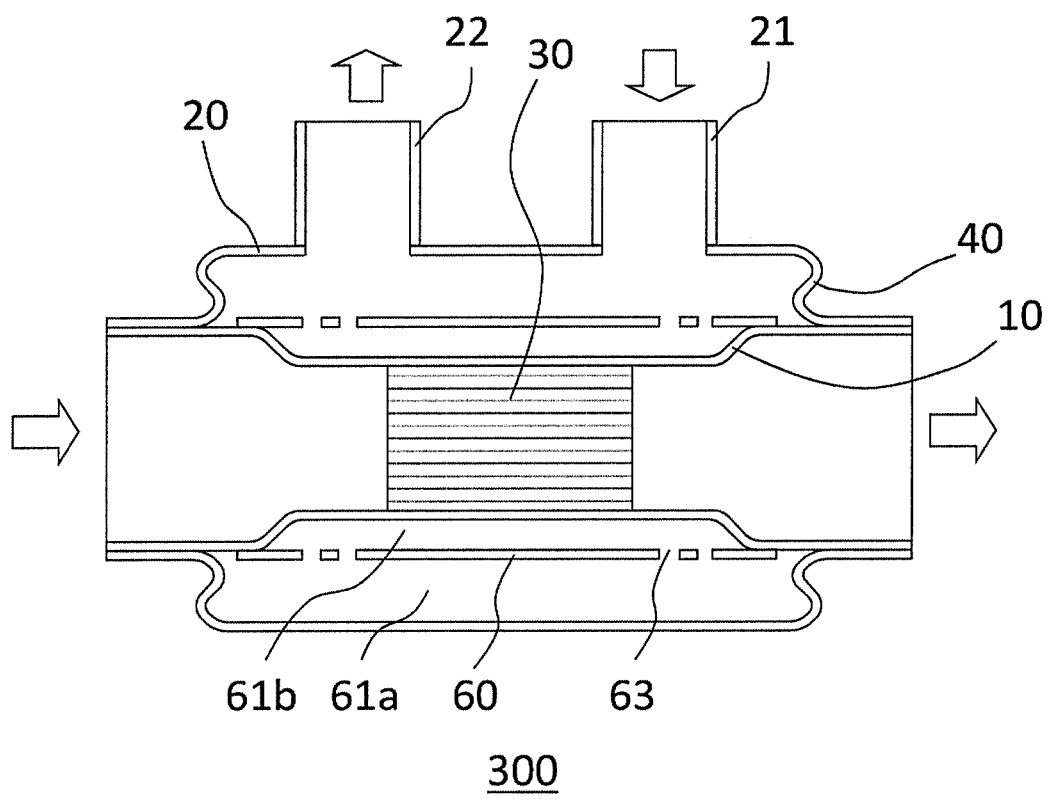
FIG. 8 is a cross-sectional view of other heat exchanger according to Embodiment 3 of the present invention.

FIGS. 7 to 8 are cross-sectional views (cross-sectional views parallel to the flow direction of the first fluid) of a heat exchanger according to Embodiment 3 of the present invention. The members having the same reference numerals as those appearing in the descriptions of the heat exchanger 100 according to Embodiment 1 of the present invention are the same as those of a heat exchanger 300 according to Embodiment 3 of the present invention. Therefore, the descriptions thereof are omitted.

The heat exchanger 300 according to Embodiment 3 of the present invention is different from the heat exchanger 100 according to Embodiment 1 of the present invention in that the former is arranged between the inner cylinder 10 and the outer cylinder 20 and further includes an intermediate cylinder 60 that partitions the flow path for the second fluid.

The intermediate cylinder 60 is a cylindrical member. It is preferable that an axial direction of the intermediate cylinder 60 coincides with of the heat recovery member 30, and a center axis of the intermediate cylinder 60 coincides with that of the heat recovery member 30.

It is preferable that an axial length of the intermediate cylinder 60 is longer than that of the heat recovery member 30. In the axial direction of the intermediate cylinder 60, the central position of the intermediate cylinder 60 preferably coincides with that of each of the heat recovery member 30, the inner cylinder 10, and the outer cylinder 20.

The providing of the intermediate cylinder 60 that partitions the flow path for the second fluid between the inner cylinder 10 and the outer cylinder 20 leads to formation of both a first flow path 61*a* for the second fluid formed between the outer cylinder 20 and the intermediate cylinder 60, and a second flow path 61*b* for the second fluid formed between the inner cylinder 10 and the intermediate cylinder 60.

When the second flow path 61*b* is filled with the liquid second fluid, the heat of the first fluid transmitted from the heat recovery member 30 to the inner cylinder 10 is transmitted to the second fluid in the first flow path 61*a* via the second fluid in the second flow path 61*b*. On the other hand, when a temperature of the inner cylinder 10 is higher and vapor (bubbles) of the second fluid is generated in the second flow path 61*b*, the thermal conduction of the second fluid in the first flow path 61*a* via the second fluid in the second flow path 61*b* is suppressed. This is because thermal conductivity of a gaseous fluid is lower than that of a liquid fluid. That is, a state where heat exchange is efficiently performed and a state where heat exchange is suppressed can be switched depending on whether or not the vapor of the second fluid is generated in the second flow path 61*b*. The states of heat exchange do not require any external control. Therefore, the providing of the intermediate cylinder 60 can allow for easy switching between promotion and suppression of heat exchange between the first fluid and the second fluid without external control.

It should be noted that the second fluid may be a fluid having a boiling point in a temperature range in which heat exchange is to be suppressed.

The method for disposing the intermediate cylinder 60 is not particularly limited. For example, as shown in FIG. 7, the intermediate cylinder 60 may be held on the inner cylinder 10 by spacers 62 provided at both ends in the axial direction of the intermediate cylinder 60. Alternatively, as shown in FIG. 8, both ends in the axial direction of the intermediate cylinder 60 may be connected to the inner cylinder 10 having the increased diameter.

Each spacer 62 is a member for securing and holding a space between the intermediate cylinder 60 and the inner cylinder 10, and is provided between the intermediate cylinder 60 and the inner cylinder 10.

It is preferable that each spacer 62 extends over the entire circumferential direction of the inner cylinder 10. The spacer 62 may be formed by one member continuously extending over the entire circumferential direction of the inner cylinder 10, or may be formed by a plurality of members arranged adjacent to or separated from each other in the circumferential direction of the inner cylinder 10.

The spacers 62 are preferably arranged at positions on two axial end faces sides of the heat recovery member 30, respectively, and are more preferably arranged at positions outside the two axial end faces of the heat recovery member 30, respectively. By arranging the spacers 62 at such positions, the heat of the heat recovery member 30 can be difficult to be transmitted to the intermediate cylinder 60 via the spacers 62. If the heat of the heat recovery member 30 is transmitted to the intermediate cylinder 60 via the spacers 62, the effect of suppressing the heat exchange by the gaseous second fluid will be reduced.

Each spacer 62 preferably has a three-dimensional structure through which the second fluid can pass. Among others, it is particularly preferable that each spacer 62 has a three-dimensional structure that allows passage of the liquid second fluid and also inhibits passage of the bubbles of the second fluid. Examples of such a three-dimensional structure include a mesh structure (a network structure) and a sponge-like structure (a porous structure). The spacer 62 "allows passage of the liquid second" means that the second fluid can pass through the spacer 62, and the spacer 62 may be a resistance to the passage of the second fluid. The spacer 62 "inhibits passage of the bubbles of the second fluid" includes adhering of the bubbles of the second fluid to the spacer 62 and resistance of the spacer 62 to the movement of the bubbles of the second fluid. It is preferable that the spacer 62 has the mesh structure because it easily achieves both allowance of passage of the liquid second fluid and inhibition of passage of babbles of the second fluid.

When a major part of the interior of the second flow path 61b is filled with the gaseous second fluid, the flowing of a large amount of the second fluid in the second flow path 61b rapidly generate boiling vaporization of the second fluid. Such rapid boiling vaporization of the second fluid causes vibrations and noises. The spacer 62 has resistance to the passage of the liquid second fluid, so that the flow of the second fluid into the second flow path 61b becomes gentle, and the generation of vibrations and noises can be suppressed.

The spacer 62 inhibits the passage of the bubbles of the second fluid, whereby the gaseous second fluid accumulates in the second flow path 61b, and the suppression of heat exchange by the gaseous second fluid is more reliably exerted. In order to more reliably exert the suppression of the heat exchange, the spacer 62 preferably has a porosity of 20% or more, and more preferably 40% or more, and even more preferably 60% or more. Further, the porosity of the spacer 62 is preferably 98% or less, and more preferably 95% or less, and further preferably 90% or less. In the present invention, the porosity of the spacer 62 is measured by the following procedure:

1) True density of the material forming the spacer 62 is determined by the Archimedes method.

2) Bulk density is determined from an apparent volume of the spacer 62 calculated from the outer dimensions (thickness and vertically and horizontally lengths) of the spacer 62 and from the weight of the spacer 62.

3) The porosity is calculated by using the relational expression:

$$porosity = (1 - bulk\ density/true\ density) \times 100\%.$$

The spacers 62 are preferably configured such that the spacer 62 provided at one end portion in the axial direction of the intermediate cylinder 60 is fixed to both the intermediate cylinder 60 and the inner cylinder 10, and the spacer 62 provided at the other end portion in the axial direction of the intermediate cylinder 60 is fixed to the inner cylinder 10 and movable to the intermediate cylinder 60. In addition, although the fixing method is not particularly limited, welding and the like can be used.

When the spacers 62 at both ends in the axial direction are fixed to both the intermediate cylinder 60 and the inner cylinder 10, respectively, the following events may occur. That is, when vapor (bubbles) of the second fluid is generated in the second flow path 61b and heat exchange between the second fluid in the second flow path 61b and the second fluid in the first flow path 61a is suppressed, a temperature difference is generated between the inner cylinder 10 and the intermediate cylinder 60. At this time, the inner cylinder 10 is heated by the heat of the first fluid, while the intermediate cylinder 60 is cooled by the second fluid in the first flow path 61a, so that the inner cylinder 10 expands rather than the intermediate cylinder 60. When the spacers 62 at both ends in the axial direction are fixed to both the intermediate cylinder 60 and the inner cylinder 10, respectively, the fixed portions at both ends in the axial direction are damaged by stress due to an expansion difference between the intermediate cylinder 60 and the inner cylinder 10, thereby shifting the positional relationship between the intermediate cylinder 60 and the inner cylinder 10 to lose the second flow path 61b.

As described above, the spacer 62 provided at one axial end of the intermediate cylinder 60 is fixed to both the intermediate cylinder 60 and the inner cylinder 10, while the spacer 62 provided at the other axial end of the intermediate cylinder 60 is fixed to the inner cylinder 10 and is movable (non-fixed) to the intermediate cylinder 60, whereby, when the inner cylinder 10 expands, the intermediate cylinder 60 slides on the spacer 62 at the non-fixed position. This can avoid damaging the fixed portion of the spacer 62 by the stress due to the expansion difference between the intermediate cylinder 60 and the inner cylinder 10 to shift the positional relationship between the intermediate cylinder 60 and the inner cylinder 10 to lose the second flow path 61b.

As shown in FIG. 8, when connecting both ends in the axial direction of the intermediate cylinder 60 to the inner cylinder 10 having the increased diameter, the intermediate cylinder 60 has through holes 63 through which the second fluid can move.

The through holes 63 may be provided on both the inlet side and the outlet side of the second flow path 61b in the flow direction of the second fluid. However, the through holes may be provided on only one of the inlet side and the outlet side.

It is preferable that a plurality of through holes 63 are provided at intervals in the circumferential direction of the intermediate cylinder 60. The number of the through holes 63 is not particularly limited. Further, the intervals between the through holes 63 may be the same or different.

It is also preferable that when connecting both ends of the intermediate cylinder 60 in the axial direction to the inner cylinder 10 having the increased diameter, one end of the intermediate cylinder 60 in the axial direction is fixed to the inner cylinder 10 having the increased diameter, and the other end in the direction is provided to be movable to the inner cylinder 10 having the increased diameter.

According to the above structure, when the inner cylinder 10 expands, the intermediate cylinder 60 slides on the inner cylinder 10 at the non-fixed position. This can avoid deforming the inner cylinder 10 by the stress due to the expansion difference between the intermediate cylinder 60 and the inner cylinder 10 to shift the positional relationship between the intermediate cylinder 60 and the inner cylinder 10 to lose the second flow path 61b.

The heat exchanger 300 having the above structure can be produced according to a method known in the art, as with the heat exchanger 100. After the heat recovery member 30 is disposed in the inner cylinder 10, the intermediate cylinder 60 may be disposed on the inner cylinder 10 via the spacers 62, or disposed directly on the inner cylinder 10 whose both ends in the axial direction have been increased.

It should be noted that the structure of the feature (the intermediate cylinder 60) of the heat exchanger 300 according to Embodiment 3 of the present invention can be applied to the heat exchanger 200 according to Embodiment 2 of the present invention.

DESCRIPTION OF REFERENCE NUMERALS 10 inner cylinder
20 outer cylinder
21 feed pipe
22 discharge pipe
23 reduced portion
24 wall
30 heat recovery member
40 continuous irregular structure
50 buffer member
60 intermediate cylinder
61a first flow path
61b second flow path
62 spacer
63 through hole
70 cone
100, 200, 300 heat exchanger

The invention claimed is:

1. A heat exchanger, comprising:
an inner cylinder through which a first fluid can flow, the inner cylinder being configured to house a heat recovery member, and the inner cylinder is in contact with the entire axial outer peripheral surface of the heat recovery member;
an outer cylinder disposed so as to be spaced on a radially outer side of the inner cylinder such that a second fluid can flow between the outer cylinder and the inner cylinder; and
an intermediate cylinder disposed between the inner cylinder and the outer cylinder to partition a flow path for the second fluid;
wherein at least one end side in the axial direction of the inner cylinder has at least one continuous irregular structure;
wherein the intermediate cylinder is held on the inner cylinder by spacers, the spacers being provided at both end portions in an axial direction of the intermediate cylinder; and
wherein the spacer provided at one end in the axial direction of the intermediate cylinder is fixed to both the intermediate cylinder and the inner cylinder, and the spacer provided at the other end in the axial direction of the intermediate cylinder is fixed to the inner cylinder and is configured to be movable to the intermediate cylinder.

2. The heat exchanger according to claim 1, wherein the at least one continuous irregular structure is a bellows structure.

3. The heat exchanger according to claim 1, wherein the heat exchanger further comprises the heat recovery member, and wherein the heat recovery member is a honeycomb structure having partition walls, the partition walls defining a plurality of cells, each of the cells extending from a first end face to a second end face.

4. The heat exchanger according to claim 1, wherein each of the spacers has a three-dimensional structure through which the second fluid can pass.

5. A heat exchanger, comprising:
an inner cylinder through which a first fluid can flow, the inner cylinder being configured to house a heat recovery member, and the inner cylinder is in contact with the entire axial outer peripheral surface of the heat recovery member;
an outer cylinder disposed so as to be spaced on a radially outer side of the inner cylinder such that a second fluid can flow between the outer cylinder and the inner cylinder, and
an intermediate cylinder disposed between the inner cylinder and the outer cylinder to partition a flow path for the second fluid;
wherein both end portions in the axial direction of the intermediate cylinder are connected to the inner cylinder having an increased diameter,
wherein the intermediate cylinder has at least one through hole through which the second fluid can move; and
wherein one end portion in the axial direction of the intermediate cylinder is fixed to the inner cylinder having the increased diameter, and the other end portion in the axial direction of the intermediate cylinder is provided to be movable to the inner cylinder having the increased diameter.

6. The heat exchanger according to claim 3, wherein the at least one continuous irregular structure is located axially outward from the first end face and/or the second end face of the honeycomb structure.

* * * * *